C. W. KEITH

June 4, 1929.

ENSILAGE CUTTER

Re. 17,315

Original Filed April 5, 1926

2 Sheets-Sheet 1

Inventor

Charles W. Keith.

By A. J. O'Brien

Attorney

C. W. KEITH

ENSILAGE CUTTER

June 4, 1929.

Re. 17,315

2 Sheets-Sheet 2

Original Filed April 5, 1926

Inventor

Charles W. Keith.

By A. J. O'Brien

Attorney

Reissued June 4, 1929. Re. 17,315

UNITED STATES PATENT OFFICE.

CHARLES W. KEITH, OF DENVER, COLORADO, ASSIGNOR TO D. K. STEPHENSON, OF DENVER, COLORADO.

ENSILAGE CUTTER.

Original No. 1,621,510, dated March 22, 1927, Serial No. 99,810, filed April 5, 1926. Reissue No. 17,120, dated October 30, 1928, Serial No. 298,073, filed August 7, 1928. This application for reissue filed March 13, 1929. Serial No. 346,772.

This invention relates to improvements in ensilage cutters and has reference more particularly to an improved construction whereby more thorough grinding, or shredding is obtained.

In the ordinary construction of ensilage cutters the fodder is cut into short pieces by knives that rotate past a cutter plate after which the cut material is acted upon by a centrifugal blower or fan which passes it into an exhaust channel where it is carried along the blast and deposited in the place where it is to be stored.

With the ordinary ensilage cutter construction, the material in its finished form is quite coarse and not as desirable as it might be for many uses.

It is the object of this invention to produce a cutter that is provided with an additional means that will operate on the cut ensilage and reduce it still more so that it will be all reduced to edible fodder.

My invention, briefly described, consists in combining with the ordinary centrifugal fan housing a foraminated partition which separates the fan chamber proper from the exhaust or delivery conduit so that no material can pass from the fan chamber into the conduit without first having passed through the foraminated partition or screen. In this manner large and improperly cut pieces of fodder will be prevented from passing into the storage bin. It will be seen from the description which will hereinafter be given that the screen will be located in such close proximity to the outer ends of the fan blades that the latter will grind, tear or crack any bulky material that may be too large to pass through the openings and that the cut material will therefore be subjected to a second disintegrating action which will reduce it to a greater degree.

Having briefly described my invention, I will now describe the same in detail, reference for this purpose being had to the accompanying drawings in which the preferred embodiment thereof has been illustrated and in which.

Figure 1:
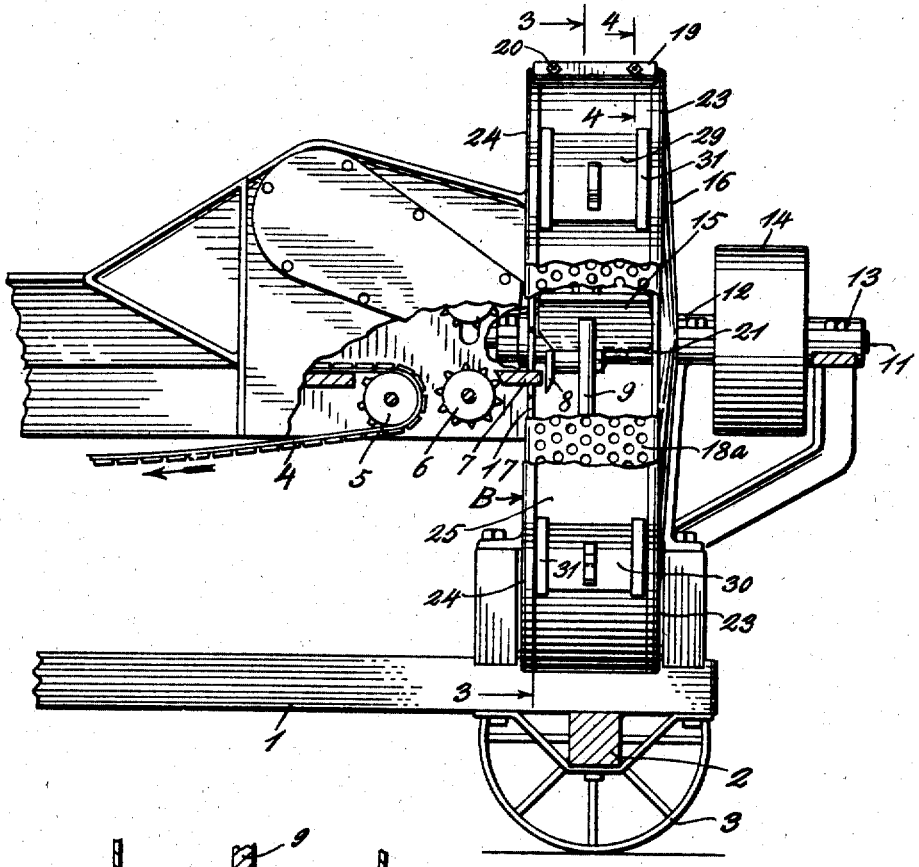
Fig. 1 is a side elevation of a portion of an ensilage cutter constructed in accordance with my invention, parts of the machine having been broken away to better disclose the construction.
Figure 2:
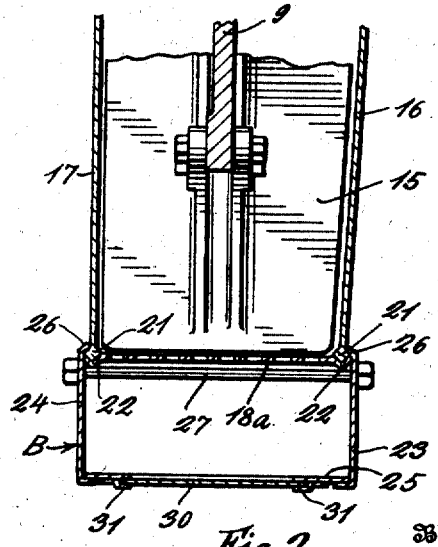
Fig. 2 is a transverse section taken on line 2—2, Fig. 3.

Numeral 1 designates the supporting framework one end of which rests upon the axle 2 to the ends of which the wheels 3 are secured. Supported from the framework is the machine proper which comprises, among other things, conveyor apron 4 which is driven from the roller 5 and moves in the direction of the arrow. A feed roller 6 carries the fodder beyond the end of the conveyor and forces it past the shear plate 7 into the path of the rotating knives 8 which rotate in close proximity to the edge of the shear plate 7. The knives 8 are securely fastened to a circular metal plate 8 by means of bolts 10 and the circular plate is nonrotatably secured to the shaft 11 which in turn is journalled in the bearings 12 and 13 and has fastened to it a drive pulley 14. Firmly secured to the circular plate 9 are a plurality of massive fan blades 15 whose leading surfaces are planes which, when extended form chords. The fan with its attached knives is enclosed in a cylindrical housing whose side walls have been indicated by numerals 16 and 17 and a cylindrical side wall 18, 18A. It will be noted that the side wall has been shown as formed of two sections, each of which is substantially 180 degrees in extent. The section marked 18A is foraminated so as to form a screen. The inside diameter of the fan housing is slightly larger than the diameter of the fan so that the outer edges of the fan will come close to but never in contact with the inner surface of sections 18 and 18A. The ends of sections 18 and 18A have each an angle iron 19, the radial flanges of which are perforated for the reception of clamping bolts 20. From Fig. 2 it will be seen that the outer edges of the sides 16 and 17 are somewhat enlarged in the manner indicated by numeral 21 and that the outer edges of the section 18A have an inwardly opening groove 22 that receives the enlargement or bead 21.

Figure 4:
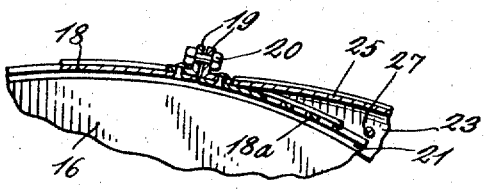
Fig. 4 is a section taken on line 4—4, Fig. 1.

It is evident that nothing can leave the fan chamber except through the openings in the section 18A and that before it can leave it must be ground down to a sufficiently small size to permit it to pass through the holes in the section 18A which is accomplished by the outer ends of the fan blades as they rotate at a high speed. After the material passes through the openings in section 18A it must be conducted to the storage compartment and for this purpose I have secured to the fan chamber a crescent shaped detachable housing which has been designated in its entirety by the letter B. This housing has been shown as formed from two crescent shaped side members 23 and 24 and a curved wall member 25. The inner edges of the sides 23 and 24 are preferably bent inwardly in the manner shown at 26 in Fig. 2 and extend over the edges of the foraminated section 18A and onto the sides 16 and 17 and are clamped against the sides of the fan chamber by means of the bolts 27. The upper end of the wall member 25 abuts the angle 19 (Fig. 4) and the lower end of the housing B terminates in a tangential tubular discharge outlet extension 28 to which the elevating pipe may be connected.

The crescent shaped housing or elbow B has been shown as provided with two sliding doors 29 and 30 that are held in place by Z-shaped guides 31 so that the doors may be moved into position to cover and uncover openings in the wall member 25.

Figure 3:
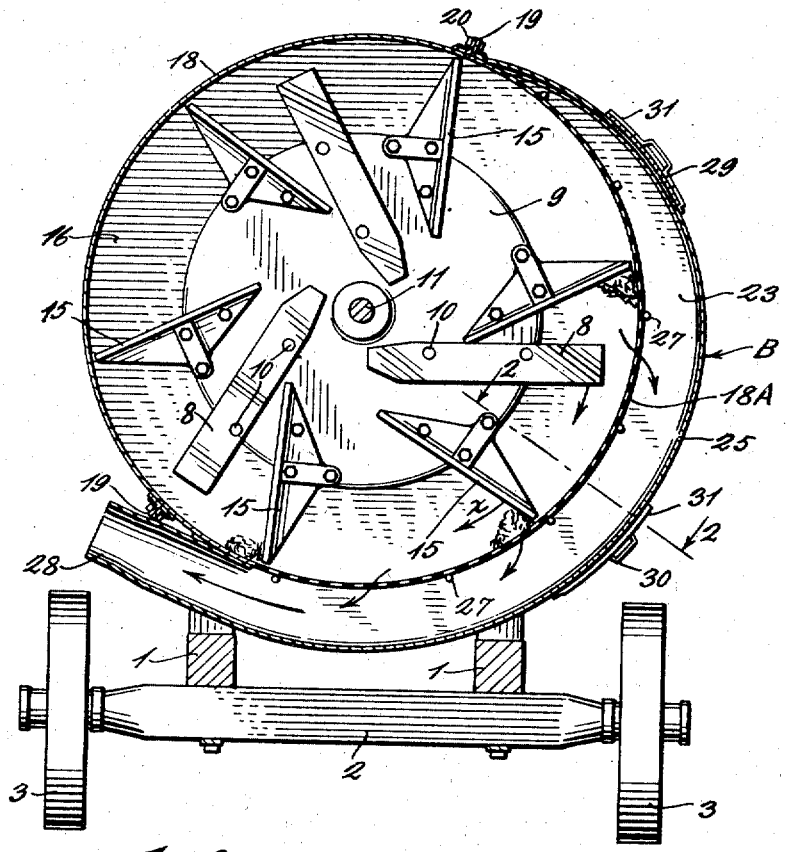
Fig. 3 is a section taken on line 3—3, Fig. 1.
Figure 5:
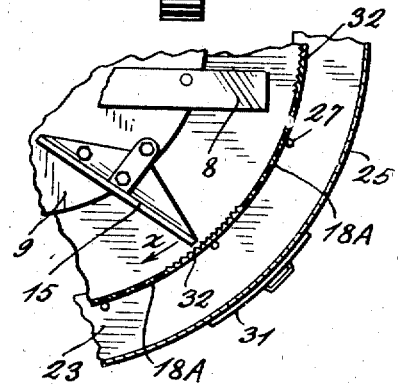
Fig. 5 is a fragmentary section similar to that shown in Fig. 3 but illustrating a slightly modified construction.

Let us now assume that the parts are assembled as shown and described and that the disk 9 with its attached knives 8 and fan blades 15 are rotated at the proper speed in the direction of arrow X (Fig. 3) and that corn stalks or alfalfa is fed into the cutting mechanism. The knives will shear the fodder as it enters over the shear plate 7 and the fodder thus cut will promptly be thrown outwardly by the centrifugal action until it rests against the inner surface of the sections 18 and 18A where it will be engaged by the ends of the fan blades and rolled along and ground between the ends of the fan blades and the inner surface of the housing until the parts are reduced to such size that they will pass through the screen 18A and into the exhaust channel formed by the elbow or housing B from which they will be quickly elevated through the elevating pipe and deposited in the place where they are to be stored. The holes in section 18A may be of any suitable size so as to reduce the material to any extent desired.

Where grain, such as corn for example, is present in the fodder it may be desirable to subject it to a more decided grinding action than is possible with the constuction just described and for this purpose the foraminated plate 18A or screen may be composed of several sections separated by sections 32 whose inner or concave surfaces are transversely striated so as to form a rough surface against which the material will be forced by the rotating vanes so as to more completely crack and grind the grain and other constituents of the fodder.

It is, of course, evident that the section 18A can be made as long or as short as desired and if it should be found necessary the entire outer wall may be made of foraminated material or of alternate sections of foraminated material and sections having serrated inner surfaces. The exhaust chamber must, however, be of sufficient extent to enclose all of the foraminated portions of the outer wall. The machine may be used with any kind of fodder or roughage which is adapted to be handled in this way and the specific materials mentioned have been cited as examples only. In the above description section 18A has been referred to as a foraminated plate or screen, it being the intention to use a heavy wire screen when this shall be preferable as it is in many instances. The wire screen being rough assists in the grinding action and to some extent at least takes the place of the serrated section 32.

When the fodder has been passed through a machine constructed in the manner described, it will be reduced to a fluffy well shredded and ground mass that makes excellent roughage for cattle and horses and greatly enhances the food value of the material.

The improved results are attained by the simple expedient of interposing a foraminated plate or screen between the fan and the exhaust passage and in such relation to the fan that the latter will cause the cut fodder to be ground against the inner surface of the cylindrical wall of the fan chamber.

And the centrifugal impeller formed by the massive fan blades on the high speed rotor, acts not only to drive a blast of air through the peripheral screen formed by the foraminous plate, but will also impinge the grain and the cut material while in suspension in the case with such an impact as to crush and comminute or otherwise reduce it, in addition to or it may be independently of the cutting and grinding actions which have been described.

Moreover, the arcuate exhaust passage formed between the peripheral screen and the adjacent outer wall of the casing, which terminates in a tangential discharge outlet, and the rotation of the centrifugal impeller in the direction of discharge, serve to freely deliver reduced material after it has been screened.

Having now described my invention what I claim as new is:

1. In an ensilage cutter, a rotor, fan blades and cutter blades mounted thereon, a casing enclosing said rotor and a foraminous partition curved about the center of rotation of the rotor and lying closely adjacent the peripheries of the fan blades to provide an exhaust passage for material passing through said partition.

2. A feed material cutter and reducer comprising a casing having an inlet opening in the side of the same, a rotor rotative in said casing and having cutters operative adjacent said opening to cut said feed material, reducing and propelling means mounted upon said rotor and operative to reduce and propel the material cut by said cutters, and a screen mounted in said casing about said reducing and propelling means and having material reducing cooperation with said reducing and propelling means, said screen being spaced from said casing to form a discharge passage and said propelling and reducing means being operative to propel the reduced material through said screen and through said passage.

3. A feed material cutter and reducer comprising a casing having an inlet opening in the side of the same, a rotor rotative in said casing and having cutters operative adjacent said opening to cut said feed material, reducing and fan means mounted upon said rotor and operative to reduce and propel the material cut by said cutters, and a screen mounted in said casing about said reducing and fan means and having material reducing cooperation with said reducing and fan means, said screen being spaced from said casing to form a discharge passage and said reducing and fan means being operative to propel the reduced material through the screen and through said discharge passage.

4. A feed material cutter and reducer comprising a casing having an inlet opening in the side of the same, a rotor rotative in said casing and having cutters operative adjacent said opening to cut said feed material, reducing and propelling means mounted upon said rotor and operative to reduce and propel the material cut by said cutters, and a screen mounted in said casing about said reducing and propelling means and having material reducing cooperation with said reducing and propelling means, said screen being spaced from said casing to form a discharge passage and said reducing and propelling means being operative to propel the reduced material through said screen.

5. In an ensilage cutter, a casing having a side opening for receiving ensilage material, a rotor in said casing, means associated with said rotor adjacent said opening for cutting the ensilage material into small particles in one zone, and means associated with said rotor for further reducing said material in another zone radially spaced outwardly from said first named zone.

6. In a feed reducing device, a rotor, fan blades on said rotor, a casing enclosing said rotor and a foraminous partition having a curved portion lying closely adjacent the peripheries of the fan blades to provide a tangential discharge passage for material passing through said partition, said partition and adjacent walls of said casing forming a continuous wall about said blades.

7. In a feed reducing device, a casing having an intake opening and a discharge passage, a rotor within said casing, fan blades constituting feed reducing members mounted on said rotor, said rotor and fan blades rotating in the direction of discharge, and a foraminous member having a curved portion supported in close proximity to the path of said reducing members and adapted to cooperate therewith for reducing feed material to a divided state, said intake opening being provided in the side of said casing between the axis of said rotor and the outer ends of said reducing members, and a discharge passage for conducting the ground material to a distance from said reducing device.

8. In a feed reducing device, a casing having intake and discharge openings, a rotor within said casing, fan blades on said rotor, said rotor and fan blades rotating in the direction of discharge, and a foraminous member having a curved portion in close proximity to the path of the outer ends of said blades for coperation therewith for reducing feed material to a divided state, said reduced material being discharged through said foraminous material and then from said casing by the air from said fan.

9. In a feed reducing device, a rotor, feed reducing fan blades mounted thereon, said rotor and fan blades rotating in the direction of discharge, a casing enclosing said rotor and a foraminous material having a curved portion supported in close proximity to the path of movement of the outer ends of said fan blades forming a partition to provide a discharge passage for material passing through said partition.

10. In a feed reducing device, a casing having an intake opening and a discharge passage, a rotor within said casing, said rotor comprising fan blades constituting feed reducing members, said rotor and fan blades rotating in the direction of discharge, and a foraminous member having a curved portion supported in close proximity to the path of said reducing members and adapted to cooperate therewith for reducing feed material to a divided state, said blades being adapted to create a blast of air for forcing the reduced material through said member and discharging the same through said passage.

11. In a feed reducing device, a casing having an intake in its side wall, and a discharge passage at its periphery, a fan member within said casing, rotating in the direction of discharge, a curved foraminous member adjacent to the outer ends of the blades of said fan, said fan blades being adapted to cooperate with said foraminous member for reducing feed material and for creating a current of air to discharge the reduced material through said passage.

12. In an ensilage cutter, a casing having an opening in its side wall for receiving ensilage material, a rotor in said casing, means associated with said rotor adjacent said opening for cutting the ensilage materials into small particles in one zone, and means associated with said rotor for further reducing said material in another zone, including a foraminous plate forming a part of the peripheral wall of the casing, the casing being enlarged beyond the said plate to form an arcute exhaust passage for the reduced material.

13. In an ensilage cutter, a casing having an opening in its side wall for receiving the material to be treated, a rotor in said casing, means associated with said rotor adjacent said opening for cutting the ensilage material into small particles in one zone, and means associated with the said rotor for further reducing the said material in another zone, including a screen mounted in the casing and curved about the axis of the rotor, the casing being enlarged beyond the screen to form an arcuate exhaust passage for the reduced material.

14. In a structure of the class described, a casing having a side opening for receiving the material, a rotor in said casing, means associated with said rotor adjacent said opening for cutting the material into small particles in one zone, means associated with said rotor for further reducing said material in another zone, including a foraminous plate continuous with the casing and curved about the axis of the rotor, the casing being enlarged beyond the said plate to form an exhaust passage, a portion of the reducing means also serving as means for producing an air blast to facilitate the passage of the material through the casing.

15. In an ensilage cutter the combination of a casing having a side opening for receiving the ensilage material, a rotor in said casing, means associated with the rotor adjacent said opening for cutting the ensilage material in one zone, and means associated with the rotor for further reducing said material in another zone, including hammer reducers carried by the rotor, and a peripheral screen continuous with the wall of the casing, the casing having a part extending beyond the screen to form an exhaust passage for the reduced material after passing through the screen.

16. In a structure of the class described, the combination of a casing having a side opening for receiving the ensilage material, a rotor in said casing, means associated with the rotor adjacent said opening for cutting the ensilage material into small particles, and means associated with the rotor for further reducing said material, including hammer reducers carried by the rotor and a peripheral screen continuous with the wall of the casing, the casing extending beyond and enclosing the screen member to form an exhaust passage for the reduced material, a portion of the reducing means also serving as means for producing an air blast through the machine to facilitate the passage of the reduced material.

17. In a material reducing device, a casing having a side opening for receiving material to be reduced and a peripheral exhaust passage for delivering reduced material, a rotor in the casing, means associated with the rotor adjacent the side opening for shear cutting the material into small particles, high speed impact means on the rotor for further reducing the cut material while in suspension in the casing, and a foraminous peripheral plate across the peripheral exhaust passage for screening the reduced material.

18. In a material reducing device, the combination with a casing provided with spaced inlet and outlet openings, of shear cutting means within said casing and associated wth said inlet opening and includig a rotary shear member, and rotary impact reducing devices within said casing coaxial with said rotary shear member for further reducing said material cut by said shear cutting means, while in suspension in the passage of the material to said outlet opening, and a foraminous peripheral plate across the outlet opening for screening the reduced material.

19. In a material reducing device, a casing having an opening in its side wall for receiving material to be reduced and having a peripheral outer wall and a tangential discharge outlet, a foraminous peripheral screen plate forming with said outer wall an arcuate exhaust passage for delivering reduced material through the tangential discharge outlet, and centrifugal comminuting and blast producing means in the casing rotating in the direction of discharge for reducing the material by impact and driving a blast of air carrying comminuted material through the peripheral screen and the tangential outlet.

20. In a material reducing device, a casing having an opening in its side wall for receiving material to be reduced and having a peripheral outer wall, a foraminous peripheral screen plate forming with said outer wall an arcuate exhaust passage for delivering reduced material, and centrifugal comminuting and blast producing impelling means in the casing rotating in the direction of discharge for reducing the material by impact and driving a blast of air carrying comminuted material through the peripheral screen and the arcuate exhaust passage.

In testimony whereof I affix my signature.

CHARLES W. KEITH.